(12) United States Patent
Park et al.

(10) Patent No.: US 10,272,662 B2
(45) Date of Patent: Apr. 30, 2019

(54) SYSTEM FOR DISASSEMBLING DISPLAY DEVICE AND METHOD FOR DISASSEMBLING DISPLAY DEVICE USING THE SAME

(71) Applicant: SAMSUNG DISPLAY CO., LTD., Yongin-si, Gyeonggi-Do (KR)

(72) Inventors: Chang-Mo Park, Seoul (KR); Hee Chang Kim, Hwaseong-si (KR); Eun Joong Mun, Seongnam-si (KR); Se Hun Park, Cheonan-si (KR); Min Ji Lee, Asan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/689,787

(22) Filed: Aug. 29, 2017

(65) Prior Publication Data
US 2018/0093466 A1 Apr. 5, 2018

(30) Foreign Application Priority Data
Oct. 5, 2016 (KR) .................. 10-2016-0128445

(51) Int. Cl.
*B32B 43/00* (2006.01)
*B32B 38/10* (2006.01)

(52) U.S. Cl.
CPC ............ *B32B 43/006* (2013.01); *B32B 38/10* (2013.01); *B32B 2457/20* (2013.01);
(Continued)

(58) Field of Classification Search
CPC . B32B 38/10; B32B 43/006; Y10T 156/1132; Y10T 156/1153;
(Continued)

(56) References Cited

U.S. PATENT DOCUMENTS

| 9,623,648 | B2 * | 4/2017 | Kim ...................... B32B 43/006 |
| 9,805,953 | B2 * | 10/2017 | Ohno .................. H01L 21/6838 |
| 2011/0198040 | A1 * | 8/2011 | Ebata ...................... B65H 41/00 156/750 |
| 2011/0318906 | A1 * | 12/2011 | Chida ............... H01L 21/67092 438/478 |

(Continued)

FOREIGN PATENT DOCUMENTS

| JP | 2001-293464 | 10/2001 |
| KR | 100166008 | 9/1998 |

(Continued)

*Primary Examiner* — Mark A Osele
*Assistant Examiner* — Nickolas R Harm
(74) *Attorney, Agent, or Firm* — F. Chau & Associates, LLC

(57) ABSTRACT

A system for disassembling a display device includes a supporting part facing a window and supporting at least a portion of the window. A window fixing part is disposed on the supporting part and is configured to fix a position of the window with respect to the supporting part. A display panel stopper is positioned above the supporting part and is spaced apart from the supporting part by a predetermined distance. A window pressurizing part is configured to apply pressure to the second region of the window along a first orthogonal to an upper surface of the supporting part. A separating stick is movable along a second direction which intersects the first direction. The separating stick is configured to be inserted between the window and a display panel adhered to the window.

25 Claims, 24 Drawing Sheets

(52) U.S. Cl.
CPC .... *Y10T 156/1132* (2015.01); *Y10T 156/1153* (2015.01); *Y10T 156/1179* (2015.01); *Y10T 156/1911* (2015.01); *Y10T 156/1961* (2015.01); *Y10T 156/1978* (2015.01); *Y10T 156/1983* (2015.01)

(58) Field of Classification Search
CPC ......... Y10T 156/1179; Y10T 156/1911; Y10T 156/1961; Y10T 156/1978; Y10T 156/1983
USPC ....... 156/716, 717, 752, 758, 761, 764, 765, 156/924
See application file for complete search history.

(56) References Cited

U.S. PATENT DOCUMENTS

| | | | |
|---|---|---|---|
| 2014/0209250 A1* | 7/2014 | Kawagoe | B32B 43/006 156/701 |
| 2015/0059987 A1* | 3/2015 | Kumakura | B32B 43/006 156/714 |
| 2015/0217557 A1* | 8/2015 | Lee | B32B 43/006 156/707 |
| 2015/0239227 A1* | 8/2015 | Itou | H01L 21/67092 156/716 |
| 2017/0077459 A1* | 3/2017 | Choi | H01L 51/56 |
| 2017/0113448 A1* | 4/2017 | Yang | B32B 43/006 |

FOREIGN PATENT DOCUMENTS

| | | |
|---|---|---|
| KR | 1020130053056 | 5/2013 |
| KR | 1020150010486 | 1/2015 |

\* cited by examiner

SYSTEM FOR DISASSEMBLING DISPLAY DEVICE AND METHOD FOR DISASSEMBLING DISPLAY DEVICE USING THE SAME

CROSS-REFERENCE TO RELATED APPLICATION

This application claims priority to Korean Patent Application No. 10-2016-0128445 filed in the Korean Intellectual Property Office on Oct. 5, 2016, the disclosure of which is incorporated by reference herein in its entirety.

(a) TECHNICAL FIELD

Exemplary embodiments of the present invention relate to a system for disassembling a display device, and more particularly to a method for disassembling a display device using the same.

(b) DISCUSSION OF RELATED ART

Examples of display devices include a liquid crystal display (LCD), a plasma display panel (PDP), an organic light emitting diode (OLED) device, a field emission display (FED), and an electrophoretic display device. As an example, the organic light emitting diode device may include two electrodes and an organic light emitting layer disposed between the two electrodes. Electrons injected from one electrode and holes injected from the other electrode may be combined in the organic light emitting layer to form excitons, and the excitons may discharge energy and emit light. The organic light emitting diode device may have self-luminance characteristics and thus a separate light source may be omitted, which may reduce a thickness and a weight of the organic light emitting display device. The organic light emitting diode device may exhibit relatively low power consumption, relatively high luminance, and relatively fast response speed. An organic light emitting diode device may be manufactured by attaching a display panel and a window to each other using an adhesive film. The adhesive film disposed between the display panel and the window may fix the display panel and the window to each other.

SUMMARY

An exemplary embodiment of the present invention provides a system for disassembling a display device and a method for disassembling a display device using the same in which damage occurring during separating a display panel and a window is reduced or eliminated.

An exemplary embodiment of the present invention provides a system for disassembling a display device including a supporting part facing a window and supporting at least a portion of the window. A window fixing part is disposed on the supporting part and is configured to fix a position of the window with respect to the supporting part. A display panel stopper is positioned above the supporting part and is spaced apart from the supporting part by a predetermined distance. A window pressurizing part is configured to apply pressure to the second region of the window along a first orthogonal to an upper surface of the supporting part. A separating stick is movable along a second direction which intersects the first direction. The separating stick is configured to be inserted between the window and a display panel adhered to the window.

The supporting part may include at least one receiving groove having a shape corresponding to a shape of the window. The at least one receiving groove may be configured to receive the window when pressure is applied to the window by the window pressuring part.

The window fixing part may include contact bars in direct contact with opposite end portions of the first region of the window facing along a third direction intersecting the first direction and the second direction.

The opposite end portions of the window may be upwardly bent along the first direction.

The contact bars may be movable along the first direction and the third direction.

The display panel stopper may be disposed on the display panel along the first direction.

The display panel stopper may be positioned to be substantially in parallel with the display panel.

The display panel stopper may include a first plate positioned to be substantially in parallel with the display panel. At least one impact absorbing part may be coupled to the first plate. A contact plate may face the display panel and an elastic member may be coupled to the contact plate.

The contact plate may adsorb and fix the display panel.

The window pressurizing part may include at least one pressurizing member in direct contact with the second region and configured to provide downward pressure to the second region along the first direction.

The at least one pressurizing member may be positioned to be substantially in parallel along a third direction intersecting the first direction and the second direction.

The pressurizing member may include a bar-shaped member extended along the first direction; and a pressurizing tip coupled to the bar-shaped member and including a flexible material.

The pressurizing member may be configured to apply force of 8 kgf to 12 kgf to the second region.

The at least one receiving groove may be configured such that the second region of the window is downwardly moved along the first direction by the window pressurizing part by from about 3 mm to about 8 mm.

The separating stick may include a first inclined surface at one end portion thereof.

The first inclined surface of the separating stick may be directed toward the display panel.

The system may include a cooling part positioned below the supporting part and configured to cool the supporting part.

The cooling part may cool the supporting part to from about −70° C. to about −100° C.

The supporting part may include at least one metal including cooper (Cu) or aluminum (Al).

An exemplary embodiment of the present invention provides method for disassembling a display device including providing a display device including a window. The window includes a first region and a second region positioned around the first region. A display panel is disposed on the first region of the window. The method includes cooling the display device. The method includes fixing, by a window fixing part, a position of the window to a supporting part supporting at least a portion of the window. The method includes applying pressure, by a window pressurizing part, to the second region of the window along a first direction orthogonal to an upper surface of the window and intersecting the second region of the window. The method includes inserting a separating stick between the window and the display panel along a second direction intersecting the first direction at the second region of the window.

The cooling of the display device may be performed before the display device is disposed on the supporting part.

The cooling of the display device may be performed after the display device is disposed on the supporting part.

The window fixing part may include contact bars in direct contact with opposite end portions of the first region of the first region of the window facing along a third direction intersecting the first direction and the second direction.

The opposite end portions of the window may be upwardly bent along the first direction.

The window pressurizing part may include at least one first pressurizing member in direct contact with the second region and configured to downwardly press the second region along the first direction.

According to an exemplary embodiment of the present invention, the system for disassembling a display device and the method for disassembling a display device using the same may separate the display panel and the window. In the process of separating the display panel and the window, the display panel and/or the widow may be prevented from being damaged.

BRIEF DESCRIPTION OF THE DRAWINGS

The above and other features of the invention will become more apparent by describing in detail exemplary embodiments thereof, with reference to the accompanying, in which.

DETAILED DESCRIPTION OF THE EMBODIMENTS

Figure 1:
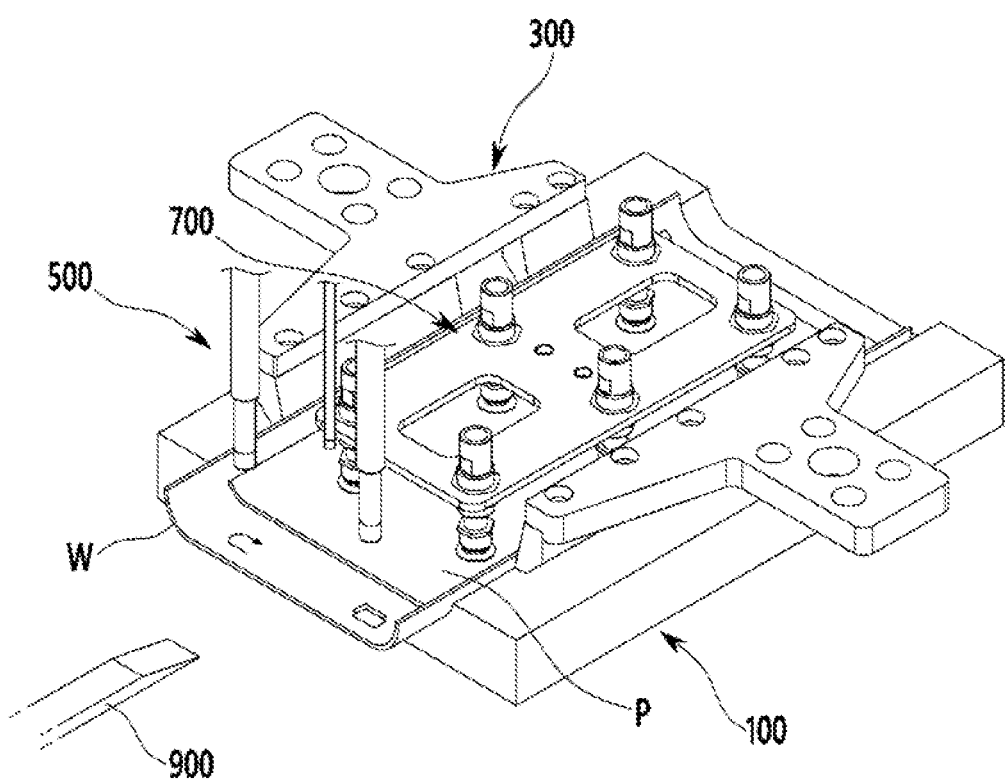
FIG. 1 is a schematic perspective view of a system for disassembling a display device according to an exemplary embodiment of the present invention.

Exemplary embodiments of the present invention will be described in more detail below with reference to the accompanying drawings, in which exemplary embodiments of the present invention are shown. As those skilled in the art would realize, the described embodiments may be modified in various different ways, all without departing from the spirit or scope of the present invention.

In the drawings, the thicknesses of layers, films, panels, or regions may be exaggerated for clarity. Like reference numerals may refer to like elements throughout the specification and drawings. It will be understood that when an element such as a layer, film, region, or substrate is referred to as being "on" another element, it may be directly on the other element or intervening elements may be present.

A system for disassembling a display device according to an exemplary embodiment of the present invention will be described in more detail below with reference to FIG. 1.

FIG. 1 is a schematic perspective view of a system for disassembling a display device according to an exemplary embodiment of the present invention.

Referring to FIG. 1, a system 10 for disassembling a display device according to an exemplary embodiment of the present invention may include a supporting part 100, a window fixing part 300, a display panel stopper 700, a window pressurizing part 500, and a separating stick 900. In a process of manufacturing a display device DE by attaching a display panel P and a window W to each other, when air bubbles or foreign materials are present between the display panel P and the window W, or the display panel P and the window W are not aligned, the system 10 for disassembling a display device according to an exemplary embodiment of the present invention may separate the display panel P and the window W from each other.

According to an exemplary embodiment of the present invention, the window fixing part 300 may fix a portion of a first region DA (see, e.g., FIG. 12) of the window W of the display device DE positioned on the supporting part 100. For example, the window W may be fixed in a desired position by applying pressure to opposite end portions of the window W. The window pressurizing part 500 may apply pressure to a second region PA (see, e.g., FIG. 12) of the window W (e.g., to an upper surface of the window W facing away from the supporting part 100. The application of pressure by the window pressuring part 500 and by the window fixing part 300 may be performed at the same time. The application of pressure to the window W (e.g., to the second region PA and to the opposite end portions of the window W) may substantially fix the widow in a desired position to allow partial separation of the window W and the display panel P. In a state in which the window pressurizing part 500 downwardly applies pressure the second region PA of the window W along a first direction (e.g., a Z axis), the separating stick 900 may be inserted between the window W and the display panel P, thus making it possible to completely separate the window W and the display panel P from each other.

Components of the system 10 for disassembling a display device according to an exemplary embodiment of the present invention will be described in more detail below with reference to FIGS. 2 to 10.

Figure 2:
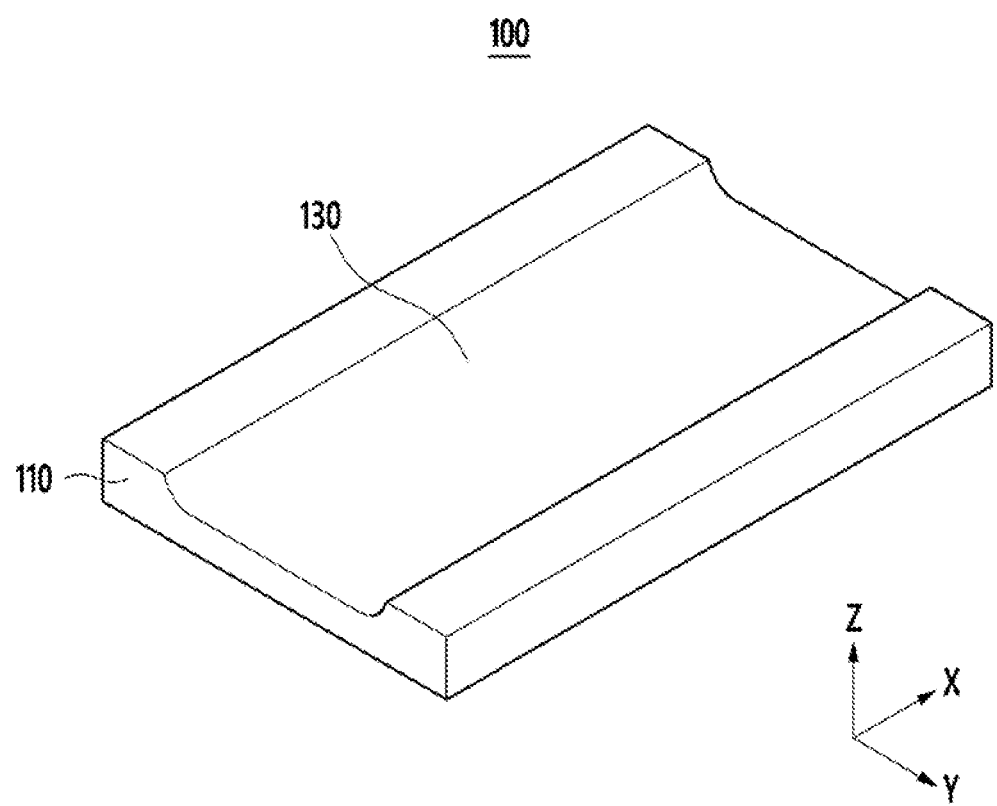
FIG. 2 is a schematic perspective view of a supporting part of FIG. 1.
Figure 3:
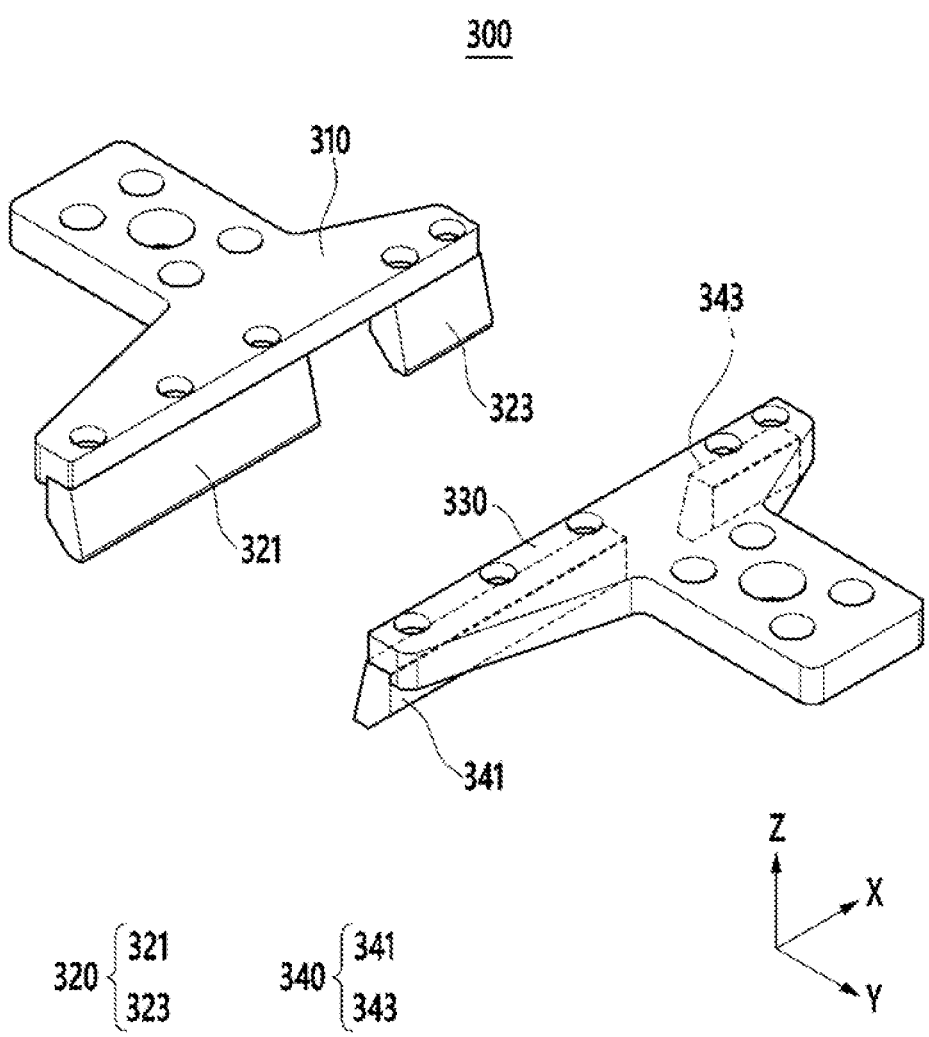
FIG. 3 is a schematic perspective view of a window fixing part of FIG. 1.
Figure 4:
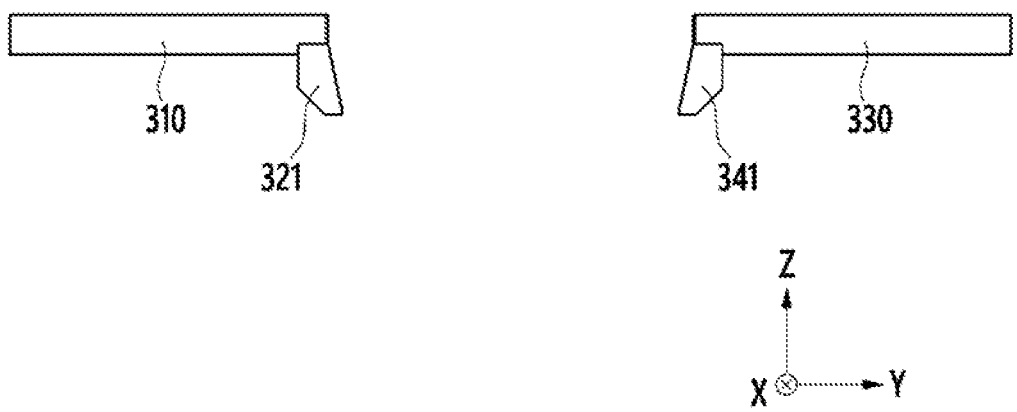
FIG. 4 is a front view of the window fixing part of FIG. 3.
Figure 5:
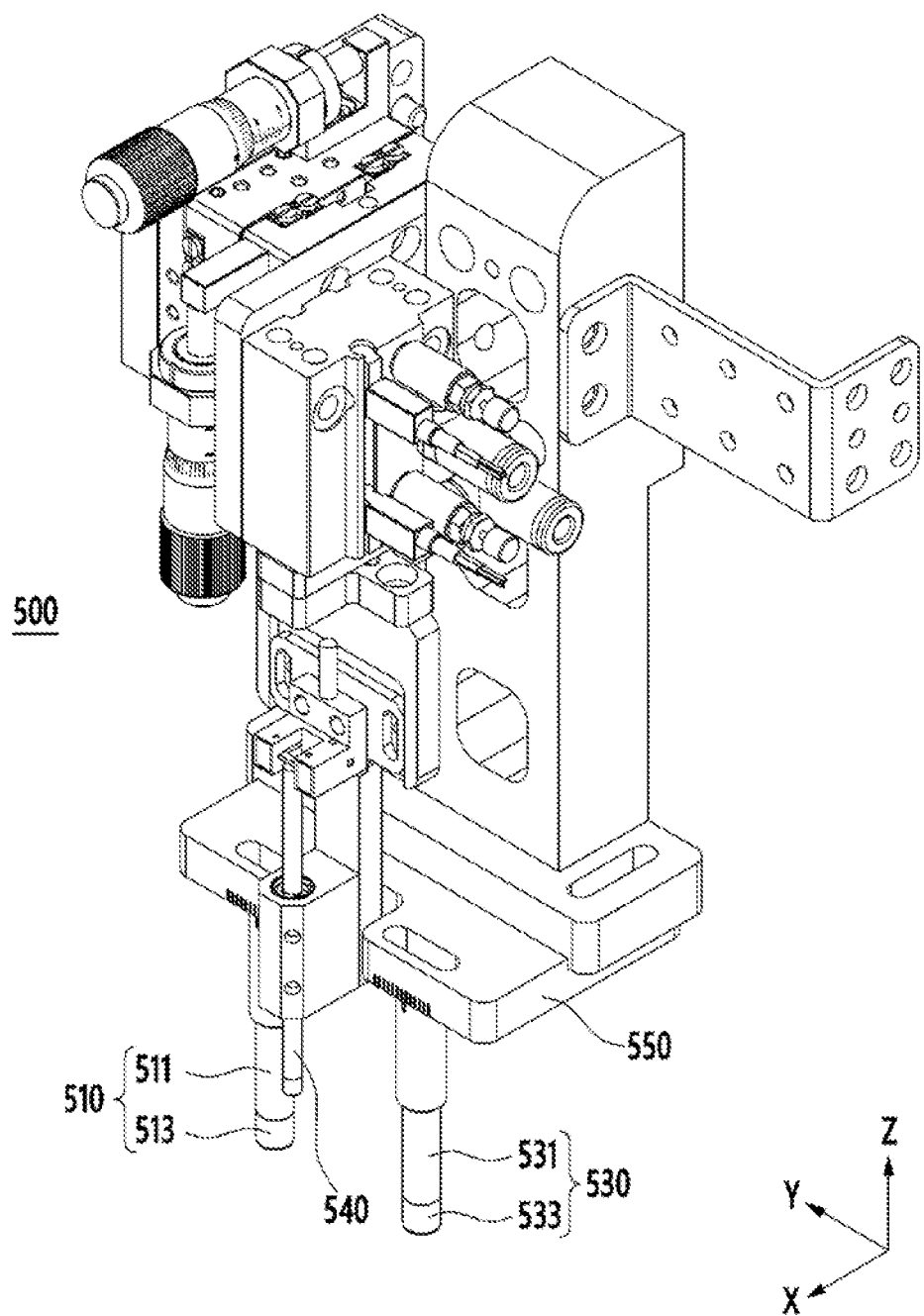
FIG. 5 is a schematic perspective view of a window pressurizing part of FIG. 1.
Figure 6:
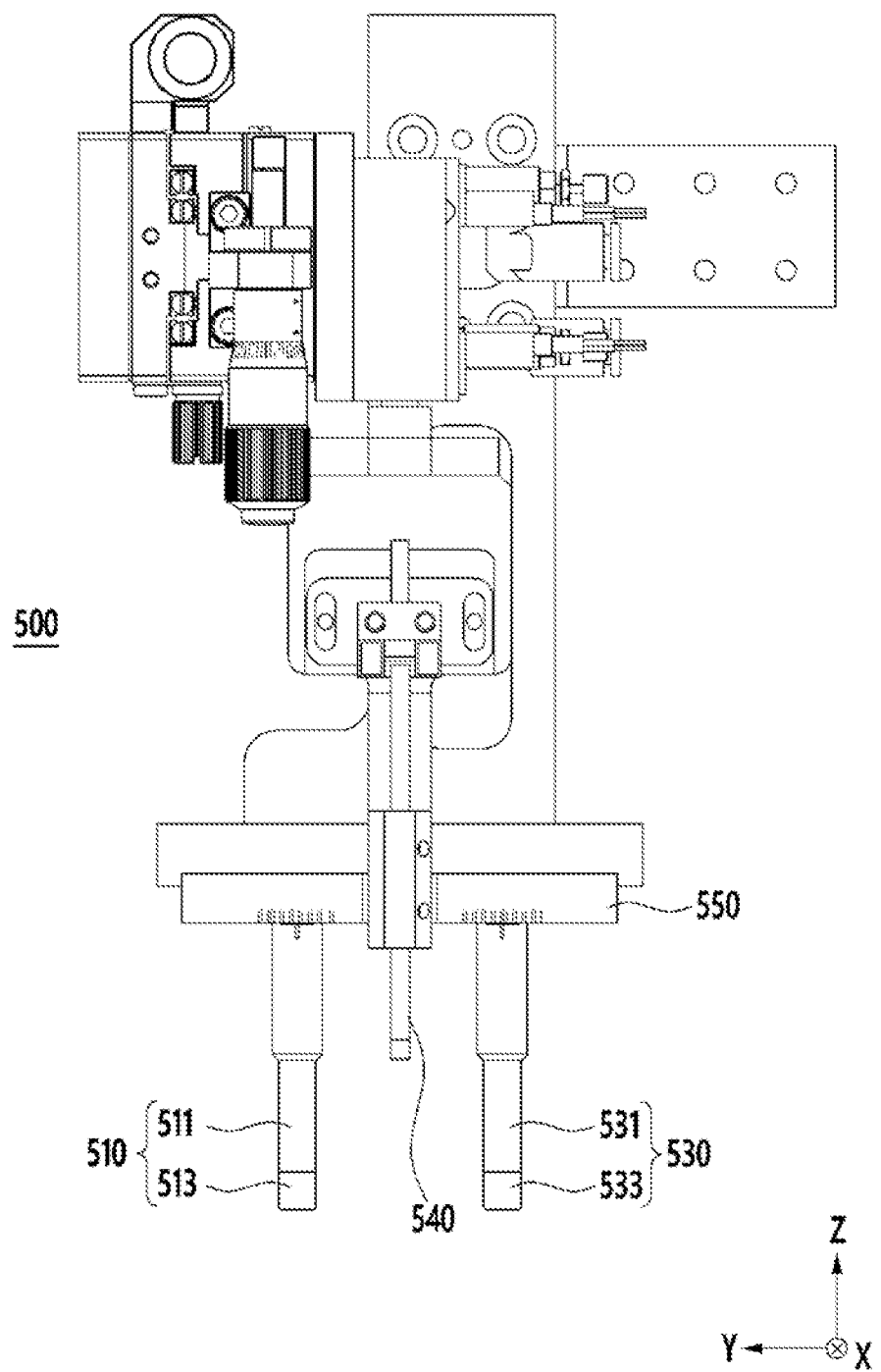
FIG. 6 is a front view of the window pressurizing part of FIG. 5.
Figure 7:
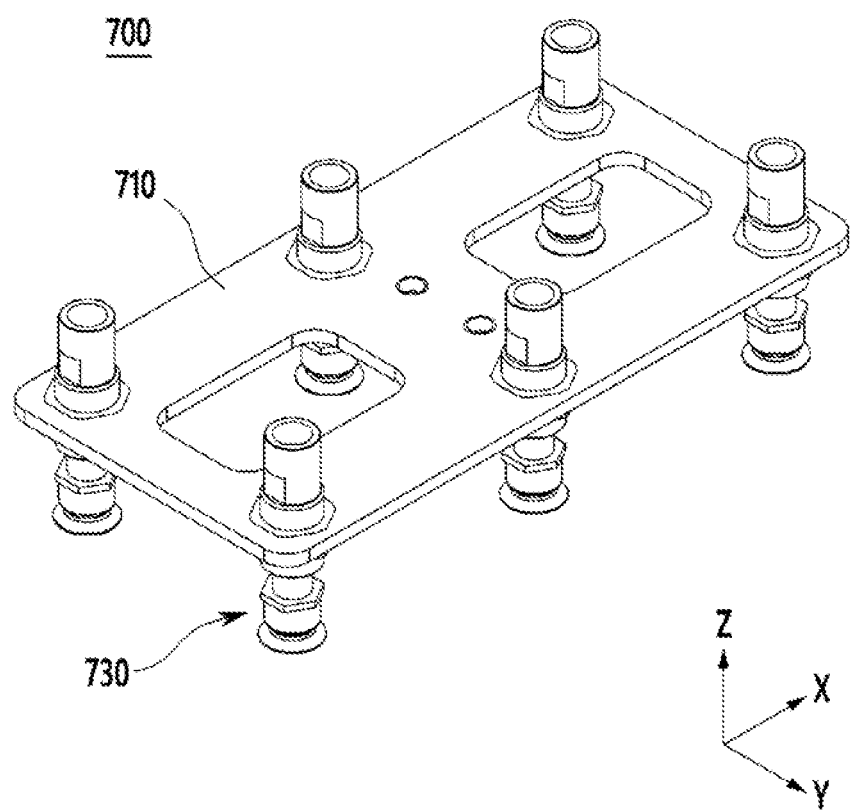
FIG. 7 is a schematic perspective view of a display panel stopper of FIG. 1.
Figure 8:
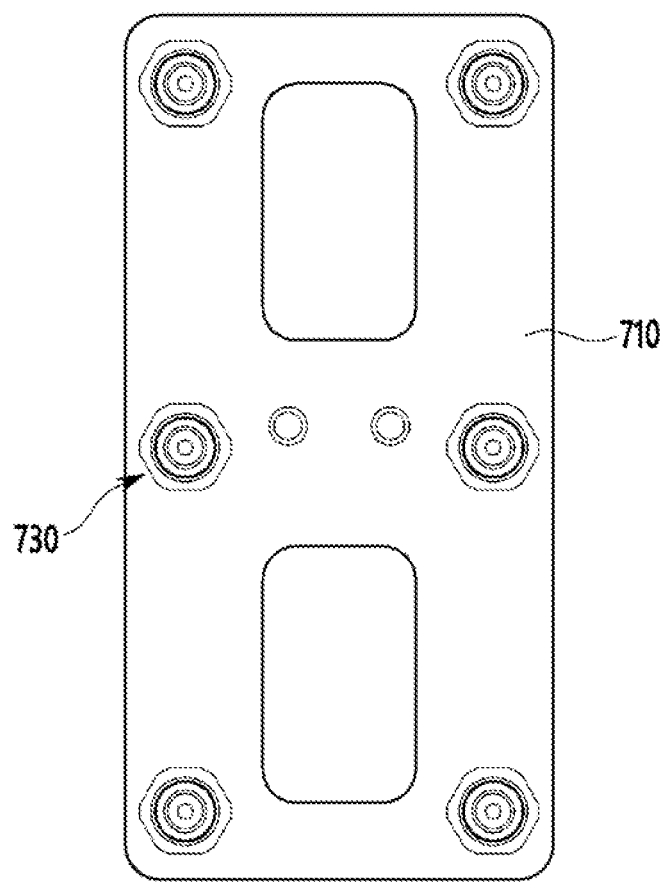
FIG. 8 is a bottom view of the display panel stopper of FIG. 7.
Figure 9:
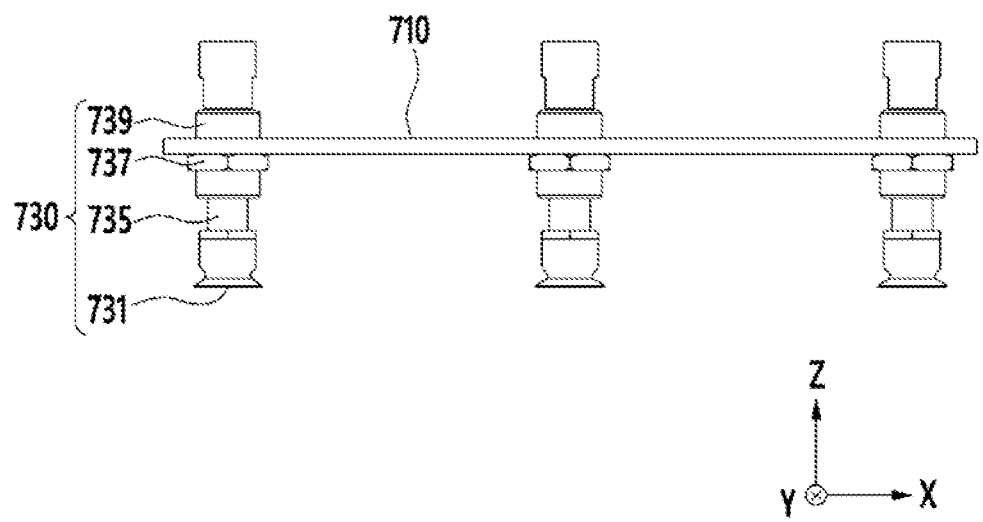
FIG. 9 is a side view of the display panel stopper of FIG. 7.
Figure 10:
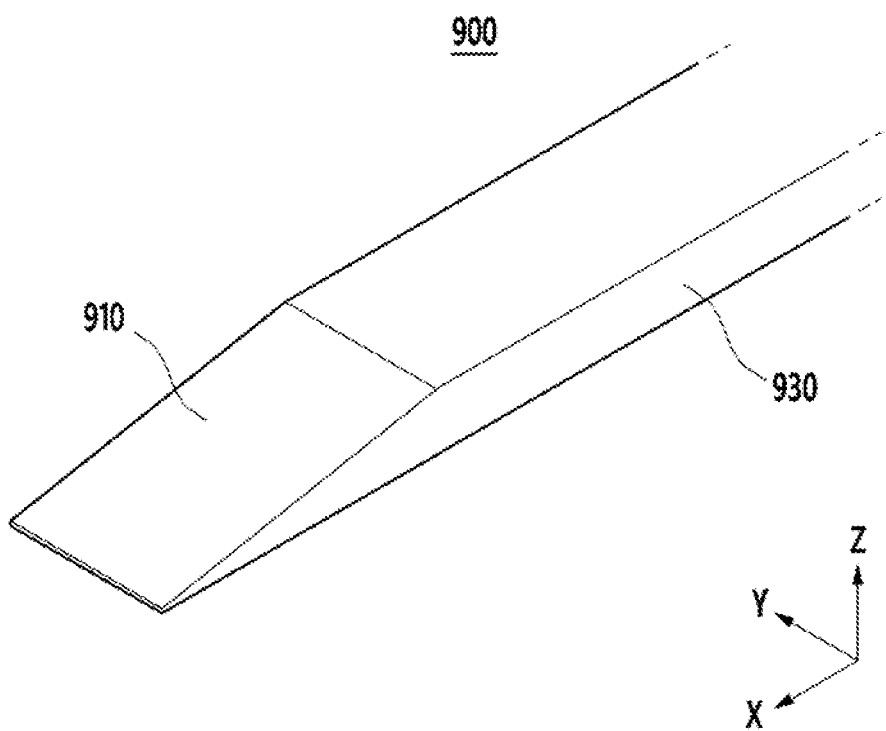
FIG. 10 is a schematic perspective view of a separating stick of FIG. 1.

FIG. 2 is a schematic perspective view of a supporting part of FIG. 1. FIG. 3 is a schematic perspective view of a window fixing part of FIG. 1. FIG. 4 is a front view of the window fixing part of FIG. 3. FIG. 5 is a schematic perspective view of a window pressurizing part of FIG. 1. FIG. 6 is a front view of the window pressurizing part of FIG. 5. FIG. 7 is a schematic perspective view of a display panel stopper of FIG. 1. FIG. 8 is a bottom view of the display panel stopper of FIG. 7. FIG. 9 is a side view of the display panel stopper of FIG. 7. FIG. 10 is a schematic perspective view of a separating stick of FIG. 1.

Referring to FIG. 2, the supporting part 100 may support a portion of the display device DE (see, e.g., FIG. 1) while the window W and the display panel P are separated from each other. For example, the supporting part 100 may support a portion of the window W (see, e.g., FIG. 1) while facing the window W. The window W of the display device DE may be positioned on the supporting part 100, and the display panel P (see, e.g., FIG. 1) may be positioned on the window W. For example, a first side of the window W facing the supporting part 100 may be in direct contact with an upper surface of the supporting part 100, and the display panel P may be disposed on a second side of the window W facing way from the supporting part 100.

As an example, the supporting part 100 may have a receiving groove 130 having a shape corresponding to a shape of the window W formed in a body 110. The receiving groove 130 may be formed in substantially the same shape as that of the window W and may support the window W so that the window W is not moved in the process of separating the window W and the display panel P from each other.

According to an exemplary embodiment of the present invention, the window W may have a shape in which opposite end portions thereof are upwardly bent along the first direction (e.g., the Z axis). As an example, both inner side surfaces of the receiving groove 130 of the supporting part 100 may have a shape which is upwardly bent along the first direction, corresponding to the shape of the window W. However, exemplary embodiments of the present invention are not limited thereto. As an example, the receiving groove 130 may have various shapes according to the shape of the window W. For example, in the case in which the window W (see, e.g., FIG. 1) has a substantially flat plate shape, an inner portion of the receiving groove 130 of the supporting part 100 may also have the plate shape. When the window W has a substantially flat plate shape, pressure may be applied to an upper surface of the window W facing away from the supporting part 100 by the window fixing part 300 to fix the window W to the supporting part 100.

Opposite end portions of the receiving groove 130 of the supporting part 100, for example, the end portions of the receiving groove 130 positioned in a second direction (e.g., an X axis) of the supporting part 100 may be open (see, e.g., FIG. 2). Thus, referring to FIG. 1, the receiving groove 130 might support only a portion of the window W, and the remaining portions of the window W not supported by the supporting part 100 may protrude in the second direction (e.g., the X axis) from the receiving groove 130. According to an exemplary embodiment of the present invention, the second region PA (see, e.g., FIG. 12) of the window W may be positioned to protrude from the supporting part 100 (e.g., from the receiving groove 130 along the X axis). As an example, a home button of the display device may be positioned in the second region PA of the window W.

The supporting part 100 may include a relatively hard material, and thus the shape of the window W may remain substantially constant. For example, the supporting part 100 may include a metal or plastic material.

Referring to FIGS. 3 and 4, the window fixing part 300 may include a first contact bar 320 and a second contact bar 340. The first contact bar 320 and the second contact bar 340 may apply downward pressure to opposite end portions of the window W along the first direction (Z axis), thus fixing the window W in the receiving groove 130 of the supporting part 100. Opposite end portions of the window W may be positioned along a third direction (e.g., a Y axis) to represent edges of the window W facing away from each other when the window W has a flat plate shape, and facing in an upward direction when the opposite end portions of the window W are curved upward away from the supporting part 100.

According to an exemplary embodiment of the present invention, the first contact bar 320 and the second contact bar 340 of the window fixing part 300 contact only the window W of the display device, and the first contact bar 320 and the second contact bar 340 do not contact the display panel P.

The first contact bar 320 and the second contact bar 340 may have a bar shape which is elongated along the second direction (e.g., the X axis). Since the window W of the display device DE has the shape which is elongated along the second direction (e.g., the X axis), the first contact bar 320 and the second contact bar 340 may also be elongated along the second direction (e.g., the X axis), corresponding to the shape of the window W.

A lower end surface of the first contact bar 320 contacting with the end portion of the window W may have a substantially flat shape. The lower end surface of the first contact bar 320 may have the substantially flat shape, and thus the lower end surface of the first contact bar 320 may uniformly contact the end portion of the window W. In addition, similar to the first contact bar 320, a lower end surface of the second contact bar 340 may also have the substantially flat shape and may substantially uniformly contact the other end portion of the window W.

As an example, the first contact bar 320 and the second contact bar 340 may include a relatively soft material so as not to damage the surfaces of the end portions of the window W contacting the first and second contact bars 320 and 340. For example, the first contact bar 320 and the second contact bar 340 may include a plastic or acryl material. However, the first contact bar 320 and the second contact bar 340 according to exemplary embodiments of the present invention are not limited thereto, and may include various materials, as desired.

The first contact bar 320 and the second contact bar 330 may be coupled to a first fixing plate 310 and a second fixing plate 330, respectively. For example, the first contact bar 320 may be coupled to the first fixing plate 310, and the second contact bar 340 may be coupled to the second fixing plate 330.

As an example, the first fixing plate 310 may move along the first direction (e.g., the Z axis) and the third direction (e.g., the Y axis). Referring to FIG. 3, the first fixing plate 310 may move in a vertical direction, which is the first direction (e.g., the Z axis), and the first fixing plate 310 may also move in a horizontal direction, which is the third direction (e.g., the Y axis). Similarly, the second fixing plate 330 may also move in the vertical direction, which is the first direction (e.g., the Z axis), and may also move in the horizontal direction, which is the third direction (e.g., the Y axis). A first driver capable of moving the first fixing plate 310 and the second fixing plate 330 along the above-mentioned directions may be coupled to the first fixing plate 310 and the second fixing plate 330. The first driver may include a driving motor and a gear.

According to an exemplary embodiment of the present invention, before the display device DE is positioned on the supporting part 100, the first fixing plate 310 and the second fixing plate 330 may be moved along the third direction (e.g. the Y axis) to be disposed in a state of being away from each other. Thereafter, when the display device DE is positioned on the supporting part 100, the first fixing plate 310 and the second fixing plate 330 may be moved along the third direction (e.g., Y axis) to be moved as much as a distance in which an interval between the first fixing plate 310 and the second fixing plate 330 is substantially equal to a width of the window W.

Next, the first fixing plate 310 and the second fixing plate 330 may be downwardly moved along the first direction (e.g., the Z axis), such that the first contact bar 320 and the second contact bar 340 coupled to the first fixing plate 310 and the second fixing plate 330, respectively, apply downward pressure to opposite end portions of the window W along the first direction (e.g., the Z axis). Thus, the window W may be fixed in the receiving groove 130 of the supporting part 100.

Referring to FIG. 3, the first contact bar 320 may include two contact bars 321 and 323. In this case, the contact bars 321 and 323 may be arranged in parallel along the second direction (e.g., the X axis). In addition, the second contact bar 340 may also include two contact bars 341 and 343. Similarly, the contact bars 341 and 343 may be arranged in parallel along the second direction (e.g., the X axis). However, exemplary embodiments of the present invention are not limited thereto, and the first contact bar 320 may include one contact bar, or may include three or more divided contact bars. The second contact bar 340 may have substantially the same configuration as the first contact bar 320.

Referring to FIGS. 5 and 6, the window pressurizing part 500 may apply downward pressure to the second region PA of the window W along the first direction (e.g., the Z axis). For example, referring to FIG. 1, the window pressurizing part 500 may apply downward pressure to the second region PA of the window W. The window pressurizing part 500 may apply pressure to the second region PA of the window W at substantially the same time that pressure is applied to the first region DA of the window W. The window pressurizing part 500 may continue to apply downward pressure to the second region PA of the window W to allow the second region PA of the window W to maintain a state which is downwardly bent along the first direction (e.g., the Z axis) below an upper surface of the supporting part 100.

According to an exemplary embodiment of the present invention, the window pressurizing part 500 may include a first pressurizing member 510, a second pressurizing member 530, and a detection sensor 540. The first pressurizing member 510 and the second pressurizing member 530 may contact the second region PA of the window W to apply pressure to the second region PA of the window W. For example, the first pressurizing member 510 and the second pressurizing member 530 may be arranged in parallel along the third direction (e.g., the Y axis).

The first pressurizing member 510 may include a first bar-shaped member 511 and a first pressurizing tip 513. The first bar-shaped member 511, which may be a member having a bar shape which is extended along the first direction (e.g., the Z axis), may apply pressure to the second region PA of the window W through the first pressurizing tip 513. The first bar-shaped member 511 may include a material having relatively strong hardness, which may transfer a force to the first pressurizing tip 513. For example, the first bar-shaped member 511 may include steel, aluminum, or SUS. Similarly, a second bar-shaped member 531 may also be a member having a bar shape which is extended along the first direction (e.g., the Z axis). A second pressurizing tip 533 may be coupled to an end portion of the second bar-shaped member 531.

The first pressurizing tip 513 and the second pressurizing tip 533, which are portions contacting the second region PA of the window W, may include a flexible material, which may prevent the window W from being damaged. For example, the first pressurizing tip 513 and the second pressurizing tip 533 may include rubber, silicon, or plastic.

According to an exemplary embodiment of the present invention, the window pressurizing part 500 may control the force transferred to the second region PA of the window W by the first pressurizing member 510 and the second pressurizing member 530. The window pressurizing part 500 may control magnitude of the force transferred to the second region PA of the window W by the first pressurizing member 510 and the second pressurizing member 530.

The window pressurizing part 500 may control a time in which the first pressurizing member 510 and the second pressurizing member 530 transfer the force to the second region PA of the window W. The window pressurizing part 500 may control a time in which the first pressurizing member 510 and the second pressurizing member 530 applying constant force to the second region PA of the window W contact the second region PA of the window W. For example, when the first pressurizing member 510 and the second pressurizing member 530 apply a force of about 10 kgf to the second region PA of the window W, the window pressurizing part 500 may adjust whether the first pressurizing member 510 and the second pressurizing member 530 apply the force for 0.5 seconds, or for 1 second. However, exemplary embodiments of the present invention are not limited thereto, and the amount of pressure applied, and the duration of the pressure applied to the window W may be adjusted, as desired.

The first pressurizing member 510 and the second pressurizing member 530 may be coupled to a pressurizing plate 550. The pressurizing plate 550, which may be a plate-shaped member, may substantially simultaneously move the first pressurizing member 510 and the second pressurizing member 530 attached to a lower portion of the pressurizing plate 550 along the first direction (e.g., the Z axis).

The detection sensor 540 may be positioned to be adjacent to the first pressurizing member 510 and the second pressurizing member 530. The detection sensor 540 may sense whether the first pressurizing member 510 and the second pressurizing member 530 accurately contact with the second region PA of the window W. The detection sensor 540 may sense the positions of the first pressurizing tip 513 and the second pressurizing tip 533, and may transfer the sensed position information to a controlling unit. The controlling unit receiving the above-mentioned information determines whether or not the first pressurizing tip 513 and the second pressurizing tip 533 arrive at an accurate position. When the positions of the first pressurizing tip 513 and the second pressurizing tip 533 are not in a desired position, the controlling unit may move the first pressurizing tip 513 and the second pressurizing tip 533 so as to be moved to a correct position.

The detection sensor 540 may sense the appearance of an unexpected object between the first pressurizing tip 513 and the second pressurizing tip 533, and the window W. For example, when a worker puts his/her hand between the first pressurizing tip 513 and the second pressurizing tip 533 and the window W, the detection sensor 540 may sense the hand of the worker. In this case, the detection sensor 540 may transfer the above-mentioned information to the controlling unit to allow operations of the first pressurizing member 510 and the second pressurizing member 530 to be stopped.

According to an exemplary embodiment of the present invention, the window pressurizing part 500 may have a second driver coupled thereto. The second driver may move the first pressurizing member 510 and the second pressurizing member 530. The second driver may include a driving motor and a gear.

Referring to FIGS. 1, and 7 to 9, a display panel stopper 700 may be positioned above the window W and may come into contact with the display panel P when the window W and display panel P are separated from each other. The display panel stopper 700 may be positioned to be spaced apart from the display panel P positioned on the window W by a predetermined distance along the first direction (e.g., the Z axis). The display panel stopper 700 may be positioned substantially in parallel with the display panel P.

The display panel stopper 700 may prevent the display panel P from being removed from above the supporting part 100 and being released to the outside at a moment when the display panel P is completely separated from the window W, in a process of separating the window W and the display panel P of the display device DE. As an example, the display panel stopper 700 is positioned on the display panel P when the display panel P is separated from the window W, such that the display panel P may be adhered to the window W again after the display panel P is separated from the window W. As an example, according to an exemplary embodiment of the present invention, when opposite end portions of the window W may have the shape which is upwardly bent along the first direction (e.g., the Z axis), and opposite end portions of the display panel P attached to the window W may also have the shape which is upwardly bent along the first direction (e.g., the Z axis).

As an example, the display panel P may be separated from an area around the window W by a restoring force of the display panel P returning the display panel P to a flat state at a moment when the display panel P is separated from the window W. However, as described above in more detail, the display panel stopper 700 may be positioned above the display panel P and may come into contact with the display panel P when the display panel P is separated from the window W, thus preventing the display panel P from being released to the outside. According to an exemplary embodiment of the present invention, the display panel stopper 700 may include a first plate 710 and at least one impact absorbing part 730. The first plate 710 may be a plate-shaped member, and at least one impact absorbing part 730 may be disposed on the first plate 710.

The impact absorbing part 730 may come into contact with the display panel P separated from the window W, thus making it possible to prevent the display panel P from being detached from the supporting part 100 and from being released to the outside. The impact absorbing part 730 may absorb the impact occurring from the display panel P, thus reducing or prevent damage occurring to the display panel P when the display panel P and the impact absorbing part 730 come into contact with each other.

The impact absorbing part 730 may include a contact plate 731, a body 735, an elastic member 739, and a fastening member 737. The contact plate 731 may be a member which is positioned at the lowest portion of the impact absorbing part 730 and is in direct contact with the display panel P. The contact plate 731 may include a flexible material, which may prevent damage on the display panel P which is in contact therewith. For example, the contact plate 731 may include rubber, or silicon.

The elastic member 739 may penetrate through the first plate 710. In this case, the elastic member 739 may be fixed to the first plate 710 by the fastening member 737. A spring, which is an elastic body, may be positioned within the elastic member 739.

The body 735 may penetrate through the elastic member 739, and the contact plate 731 may be coupled to one end portion of the body 735. Thus, when the contact plate 731 is in contact with the display panel P, the body 735 coupled to the contact plate 731 may be upwardly moved along the first direction (e.g., the Z axis). In this case, the elastic member 739 coupled to the body 735 may absorb the impact.

According to an exemplary embodiment of the present invention, a plurality of impact absorbing parts 730 may be disposed on the first plate 710. According to an exemplary embodiment of the present invention, six impact absorbing parts 730 may be disposed on the first plate 710; however, exemplary embodiments of the present invention are not limited thereto, and a number of the impact absorbing parts less than 6 or more than 6 may also be disposed on the first plate 710.

The impact absorbing part 730 may adsorb and fix the display panel P through the contact plate 731. For example, holes may be formed in the contact plate 731 and the display panel P may be vacuum-adsorbed through the holes, thus fixing the display panel P to the display panel stopper 700. After the display panel P is separated from the window W, the display panel P may be re-adhered to the window W. Alternatively, the impact absorbing part 730 may adsorb and fix the display panel P to discharge the display panel P to the outside.

Referring to FIGS. 1 and 10, the separating stick 900 may be inserted between the display panel P and the window W to separate the display panel P and the window W from each other.

The separating stick 900 may have a first inclined surface 910 at one end portion of a stick body 930. The stick body 930 may be a bar-shaped member which is extended along the second direction (e.g., the X axis). As an example, the stick body 930 may have a square pillar shape.

By the first inclined surface 910 of the separating stick 900, at least one end portion of the separating stick 900 may have a wedge shape. Thus, at least one end portion of the separating stick 900 may be inserted between the display panel P and the window W.

The first inclined surface 910 may be upwardly directed along the first direction (e.g., the Z axis). For example, when the separating stick 900 is inserted between the display panel P and the window W, the first inclined surface 910 of the separating stick 900 may face toward the display panel P. As an example, the separating stick 900 may be inserted and moved between the display panel P and the window W while the first inclined surface 910 of the separating stick 900 upwardly pushes the display panel P.

The separating stick 900 may include a relatively hard material and thus the separating stick 900 may separate the display panel P and the window W from each other. For example, the separating stick 900 may include a metal or plastic material.

A process of disassembling a display device using the system for disassembling a display device according to an exemplary embodiment of the present invention will be described in more detail below with reference to FIGS. 11 to 21.

Figure 11:
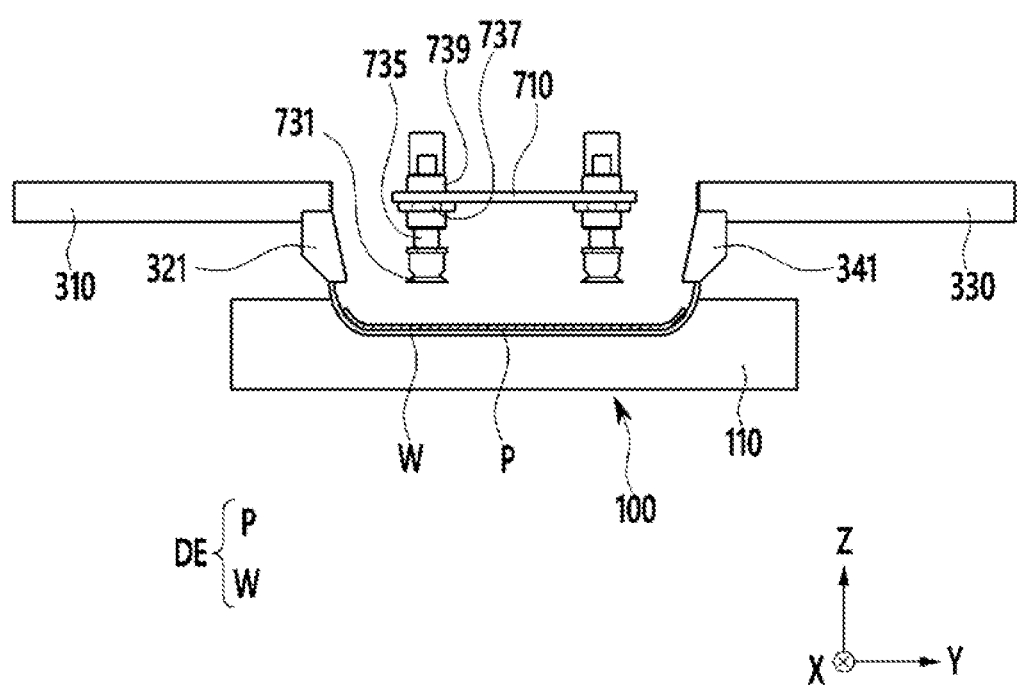
FIG. 11 is a front view of a system for disassembling a display device to which the display panel stopper, the window fixing part, and the supporting part are coupled.

FIG. 11 is a front view of a system for disassembling a display device to which the display panel stopper, the window fixing part, and the supporting part are coupled. FIGS. 12 to 15 are plan views illustrating a process of disassembling a display device according to an exemplary embodiment of the present invention. FIGS. 16 to 21 are side views illustrating a process of disassembling a display device according to an exemplary embodiment of the present invention.

According to an exemplary embodiment of the present invention, before the display device DE is positioned on the supporting part 100, the display device DE in which the window W and the display panel P are coupled to each other by an adhesive film AF (see, e.g., FIG. 16) may be cooled. According to an exemplary embodiment of the present invention, the display device DE may be cooled to from about −70° C. to about −100° C. The adhesive film AF for coupling the window W and the display panel P to each other may have adhesion which is decreased in the above-mentioned temperature range. As an example, the window W and the display panel P may be more easily separated from each other by pre-cooling the adhesive film AF to the above-mentioned temperature range. The adhesive film AF may be one of an optical clear adhesive (OCA), an optical clear resin (OCR), or a pressure sensitivity adhesive (PSA).

The display device DE cooled to the above-mentioned temperature range may be positioned on the supporting part 100. As an example, the window W of the display device DE may be positioned within the receiving groove 130 of the supporting part 100.

Figure 12:
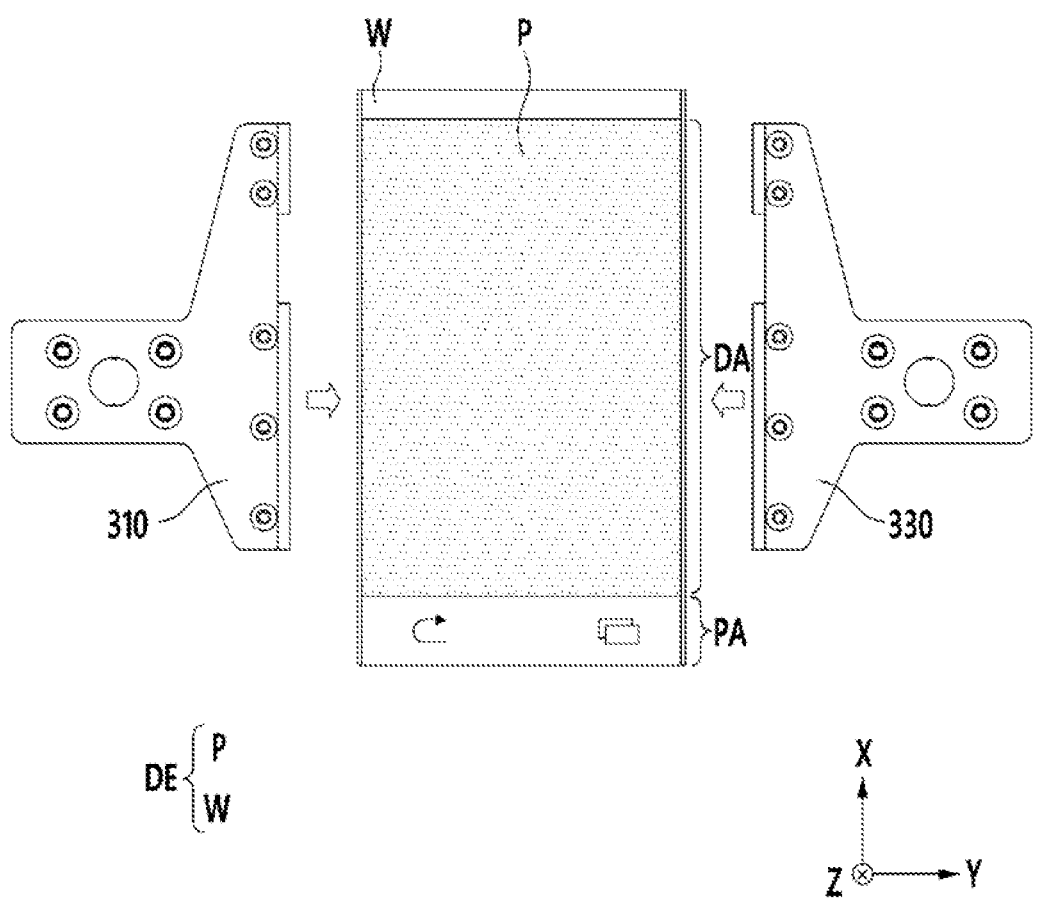
FIGS. 12 to 15 are plan views illustrating a process of disassembling a display device according to an exemplary embodiment of the present invention.
Figure 13:
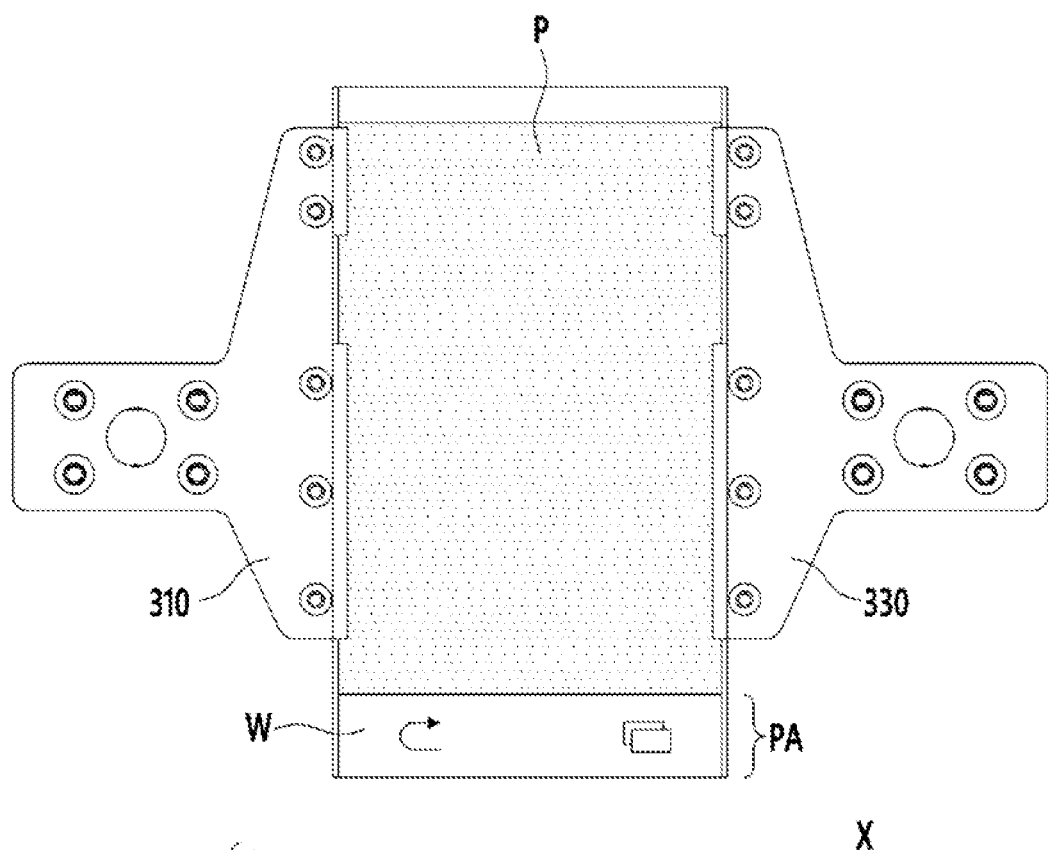

Referring to FIGS. 12 and 13, the window fixing part 300 may be positioned at opposite end portions of the window W, thus fixing the position of the window W within the receiving groove 130 of the supporting part 100. The window fixing part 300 may fix a portion of the first region DA of the window W. Referring to FIG. 11, the first contact bar 321 and the second contact bar 341 of the window fixing part 300 may downwardly press opposite end portions of the window W along the first direction (e.g., the Z axis), thus fixing the window W to the supporting part 100.

Figure 14:
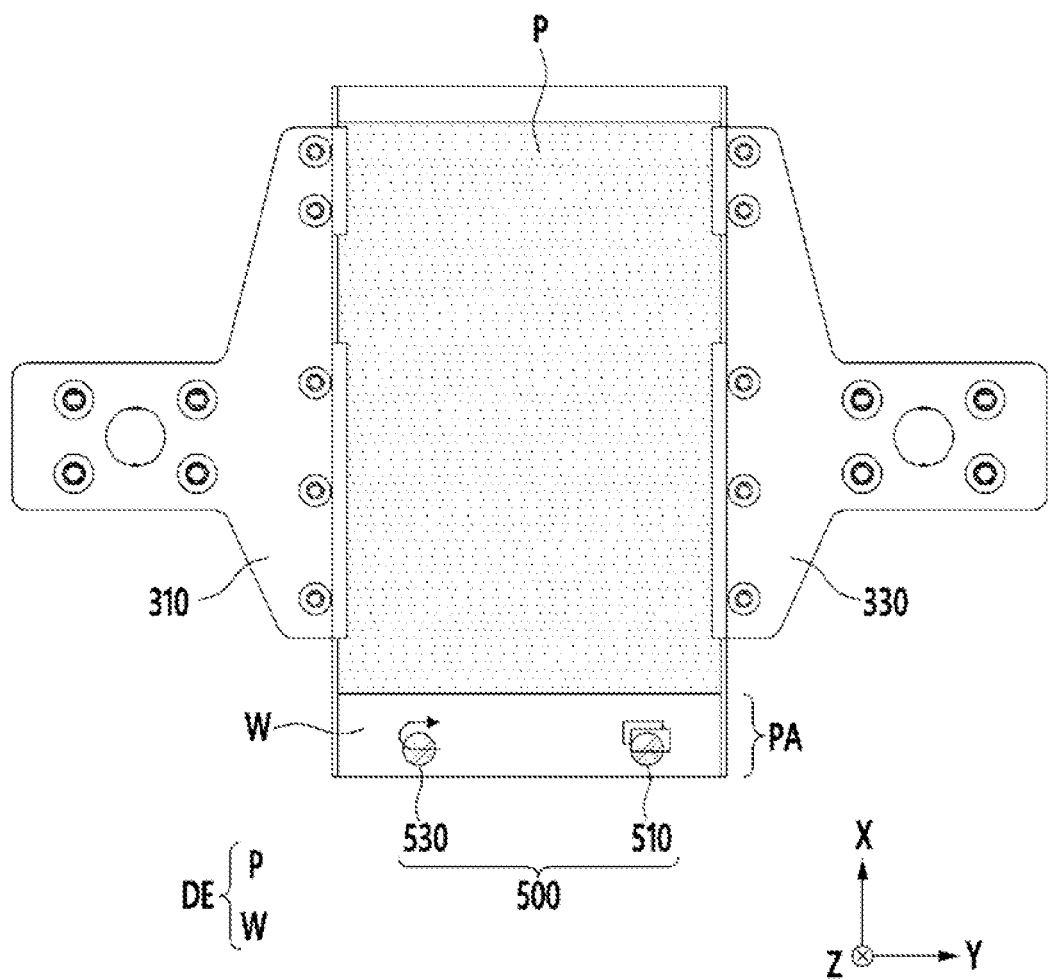

Referring to FIG. 14, the first pressurizing member 510 and the second pressurizing member 530 of the window pressurizing part 500 may apply pressure to the second region PA of the window W. The first pressurizing member 510 and the second pressurizing member 530 may downwardly apply pressure to the second region PA of the window W along the first direction (e.g., the Z axis).

Figure 16:
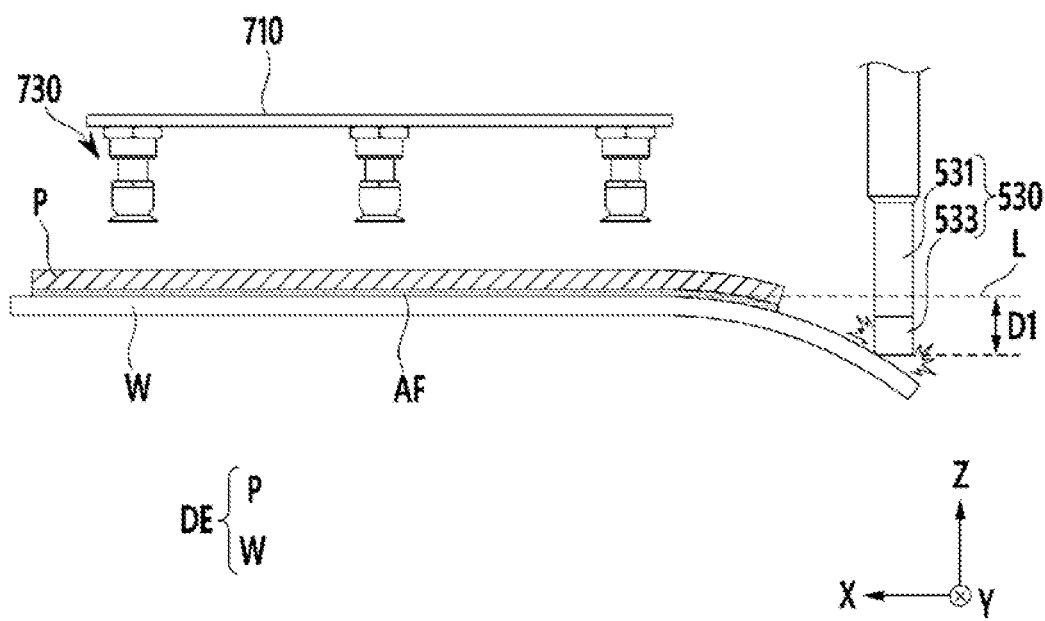
FIGS. 16 to 21 are side views illustrating a process of disassembling a display device according to an exemplary embodiment of the present invention.

Referring to FIG. 16, the second pressurizing member 530 may apply the pressure to the second region PA (see, e.g., FIG. 17) of the window W. The second pressurizing member 530 may downwardly apply pressure to the second region PA along the first direction (e.g., the Z axis). The second pressurizing member 530 may apply from about 8 kgf to about 12 kgf to the second region PA of the window W. The second pressurizing member 530 may apply the above mentioned force for about 1 second to the second region PA of the window W. In addition, the second pressurizing member 530 may apply force to an end portion of the second region PA of the window W so as to downwardly descend to a first depth D1 with respect to a horizontal line L. In this case, the first depth D1 may be from about 3 mm to about 8 mm.

According to an exemplary embodiment of the present invention, after the pressure is applied to the second region PA of the window W of the display device DE which is cooled to from about −70° C. to about −100° C., delamination may occur between the display panel P and the window W positioned in the first region DA which is adjacent to the second region PA.

Figure 17:
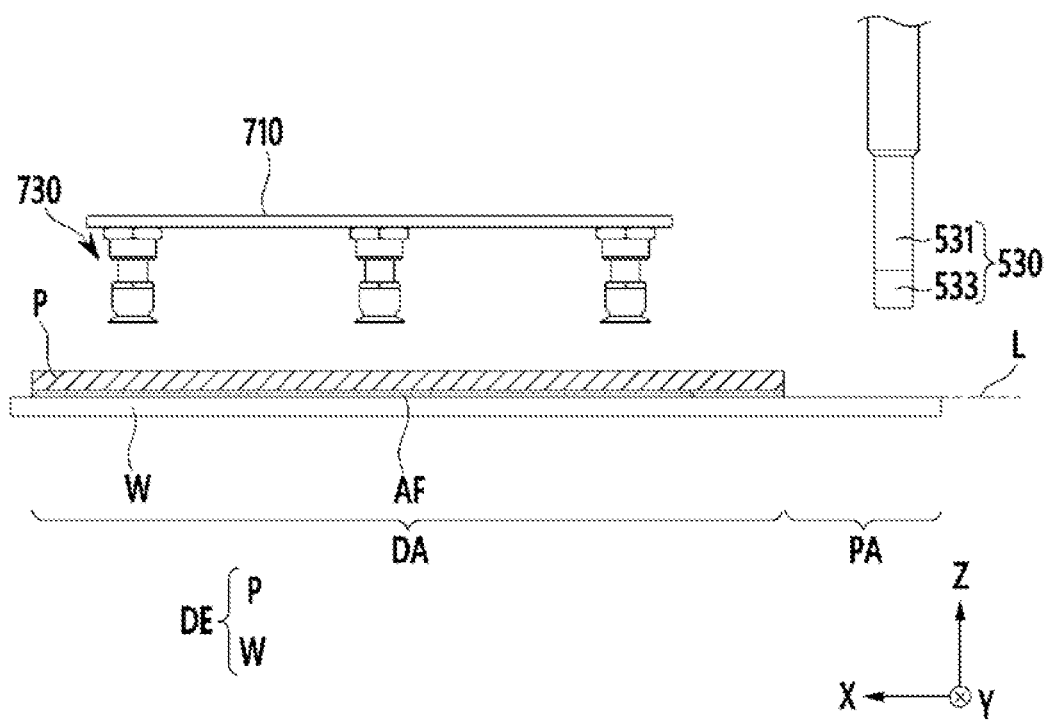

Referring to FIG. 17, after the second pressurizing member 530 applies the pressure to the second region PA of the window W, the second pressurizing member 530 may again ascend to an original position.

Figure 18:
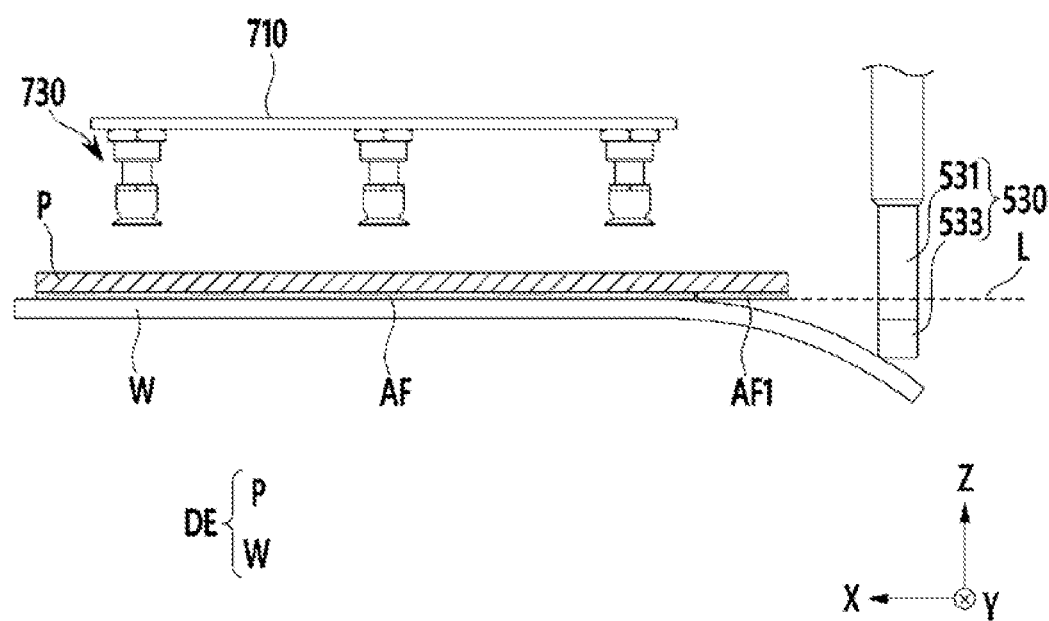

Referring to FIG. 18, the second pressurizing member 530 that ascends to the original position again may continue to apply pressure to the second region PA of the window W. In this case, the second pressurizing member 530 slowly presses the second region PA of the window W downwardly along the first direction (e.g., the Z axis). Thus, the second region PA of the window W may downwardly descend by from about 3 mm to 8 mm along the first direction (e.g., the Z axis) with respect to the horizontal line L.

Figure 15:
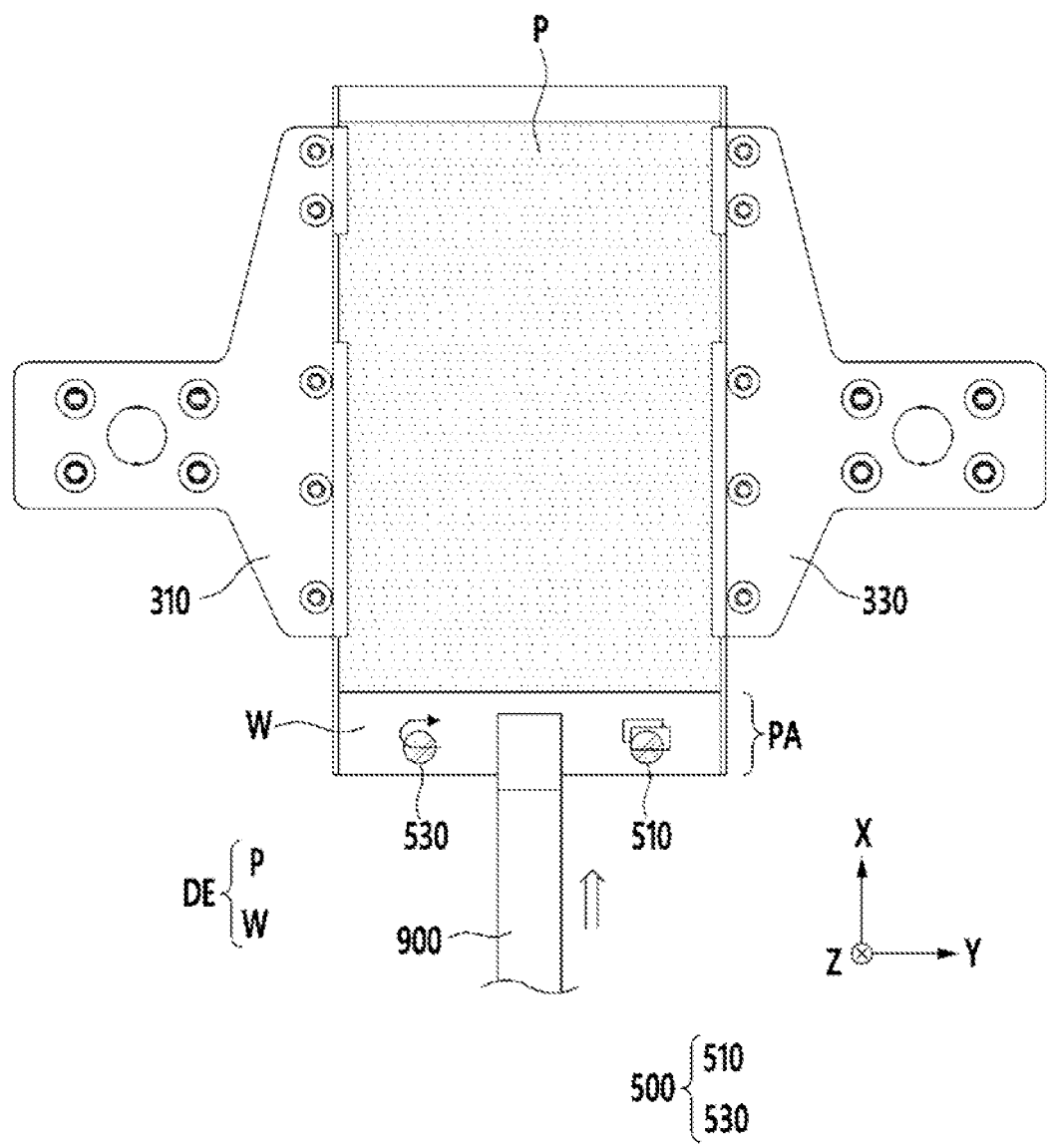
Figure 19:
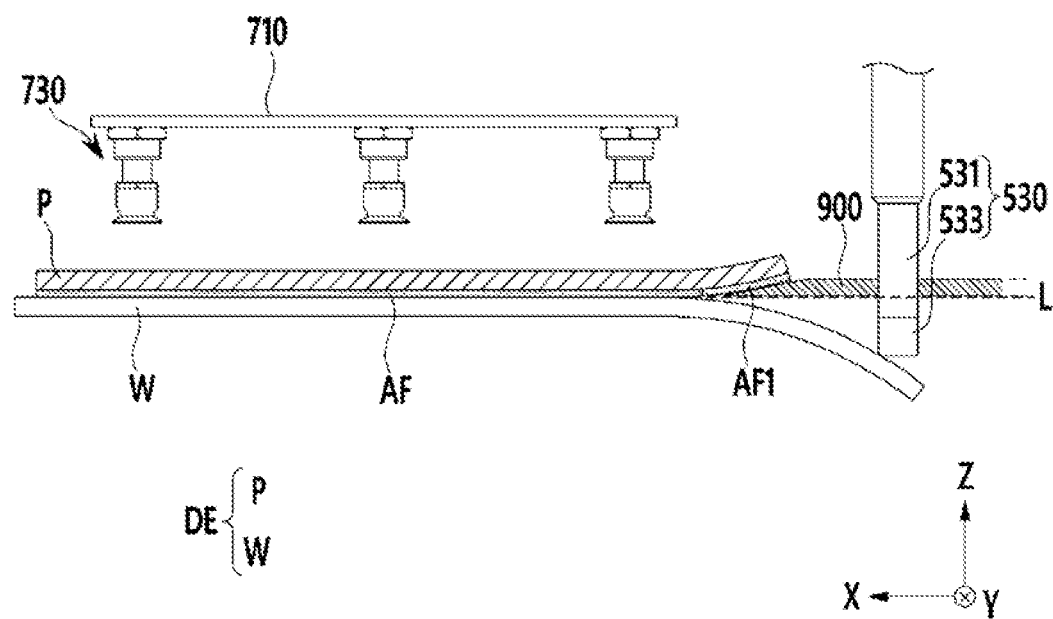

Referring to FIGS. 15 and 19, in the state in which the second pressurizing member 530 downwardly presses the second region PA of the window W, the separating stick 900 may be moved along the second direction (e.g., the X axis). In this case, the separating stick 900 may be inserted between the display panel P and the window W while being moved along the second direction (e.g., the X axis).

Referring to FIG. 16, since the second pressurizing member 530 partially delaminates between the display panel P and the window W, the separating stick 900 may be more easily inserted between the display panel P and the window W which are delaminated. In this case, some adhesive films AF1 among the adhesive films AF positioned between the display panel P and the window W may be attached to the display panel P.

Figure 20:
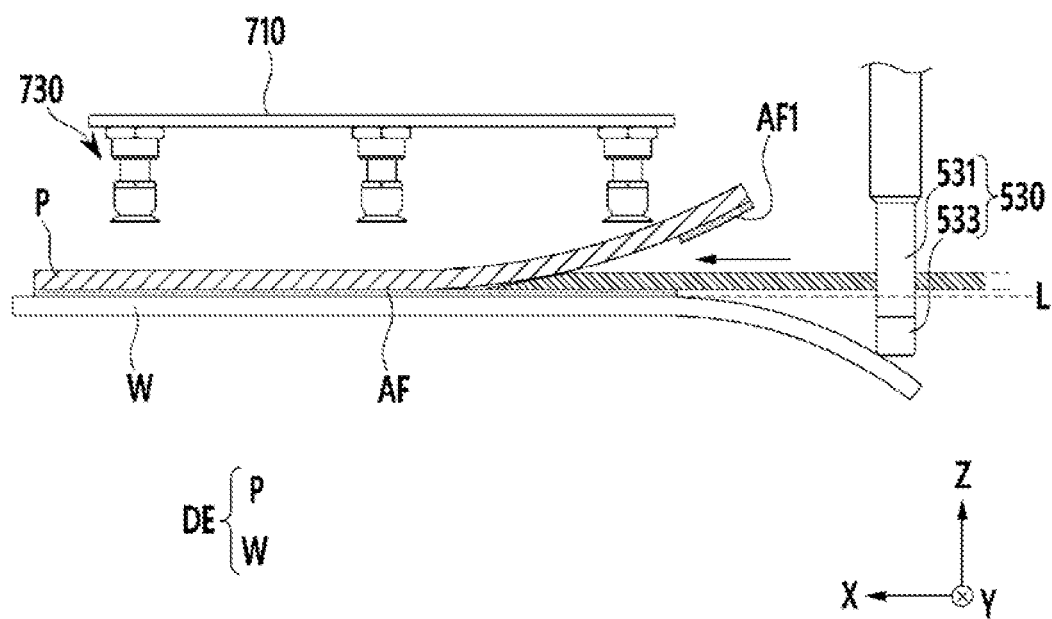
Figure 21:
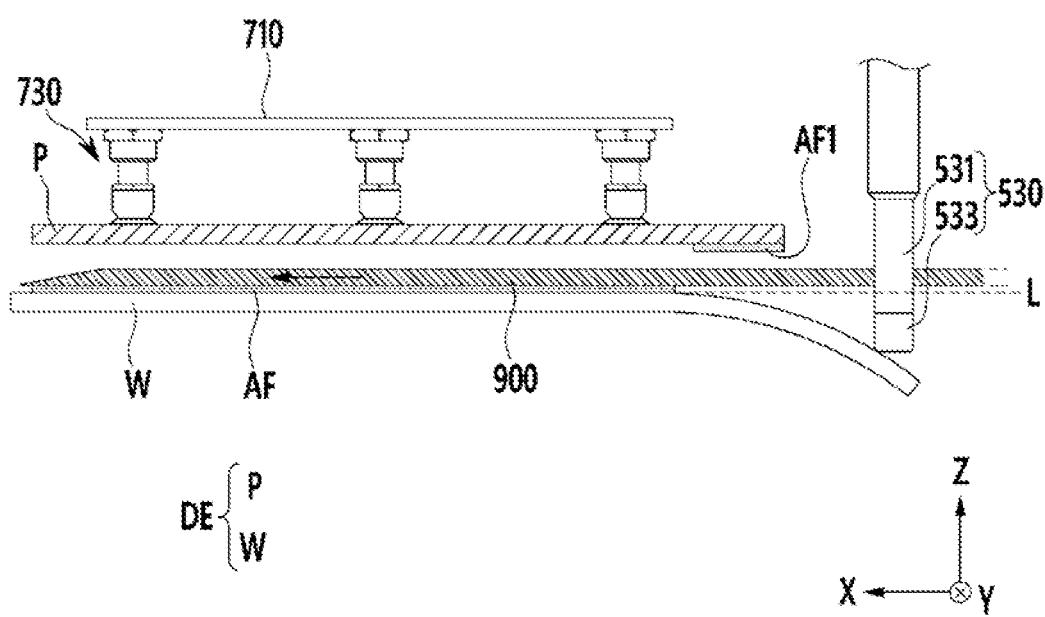

Referring to FIGS. 20 and 21, if the separating stick 900 continuously moves along the second direction (e.g., the X axis), the display panel P may be completely separated from the window W while the adhesive film AF and the display panel P are separated from each other. According to an exemplary embodiment of the present invention, in the adhesive film AF positioned between the display panel P and the window W, the adhesive film AF1 may be separated from the window W by the pressure applied by the second pressurizing member 530, and may remain on the display panel P. Thereafter, if the separating stick 900 having the first inclined surface 910 is moved along the second direction (e.g., the X axis), the adhesive film AF may be separated from the display panel P, and may remain on the window W (see, e.g., FIG. 21).

A system for disassembling a display device according to an exemplary embodiment of the present invention will be described in more detail below with reference to FIGS. 22 and 24. A detailed description of the same configurations as the exemplary embodiments described above may be omitted below.

Figure 22:
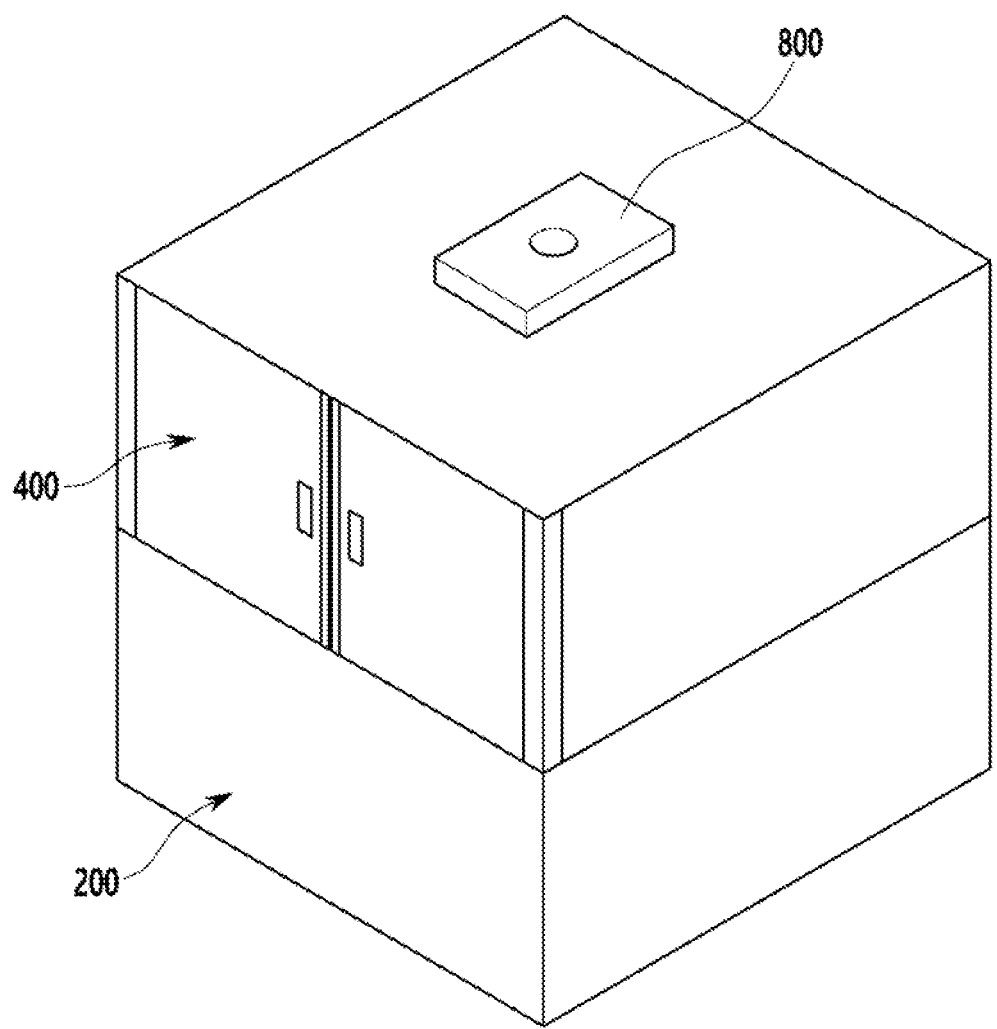
FIG. 22 is a schematic perspective view of a system for disassembling a display device according to an exemplary embodiment of the present invention.
Figure 23:
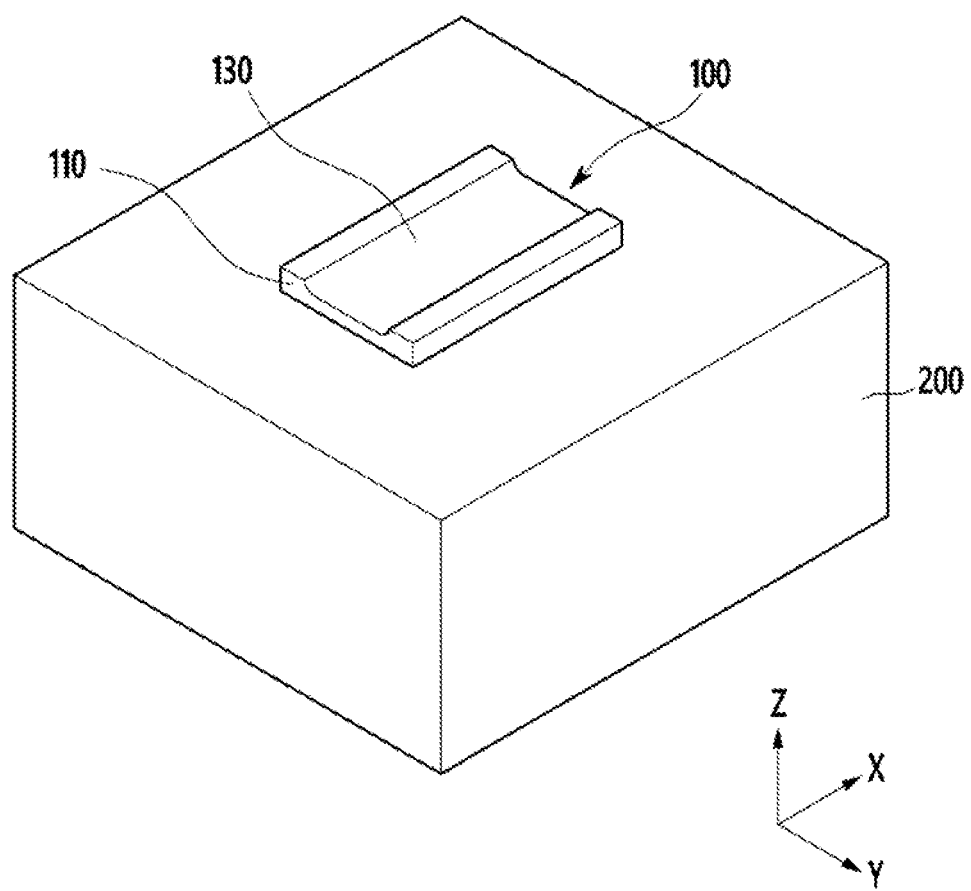
FIG. 23 is a schematic perspective view of a supporting part according to an exemplary embodiment of the present invention.

FIG. 22 is a schematic perspective view of a system for disassembling a display device according to an exemplary embodiment of the present invention. FIG. 23 is a schematic perspective view of a supporting part according to an exemplary embodiment of the present invention. FIG. 24 is a schematic perspective view of a supporting part according to an exemplary embodiment of the present invention.

Referring to FIGS. 22 and 23, the system for disassembling a display device according to an exemplary embodiment of the present invention may further include a cooling part 200, a housing 400, and a fan-filter part 800, in addition to the supporting part 100, the window fixing part 300, the display panel stopper 700, the window pressurizing part 500, and the separating stick 900 described above in more detail with reference (see, e.g., FIG. 1).

According to an exemplary embodiment of the present invention, the housing 400 may be a structure having a space enclosed from the outside, and the supporting part 100, the window fixing part 300, the display panel stopper 700, the window pressurizing part 500, and the separating stick 900 of FIG. 1 may be disposed in the housing 400. A predetermined space may be formed in the housing 400, such that the supporting part 100, the window fixing part 300, the display panel stopper 700, the window pressurizing part 500, and the separating stick 900 (see, e.g., FIG. 1) may be disposed in the space.

The supporting part 100, the window fixing part 300, the display panel stopper 700, the window pressurizing part 500, and the separating stick 900 may be disposed in the housing 400, and thus the temperature of the cooled window W (see, e.g., FIG. 1) and display panel P (see, e.g., FIG. 1) may be constantly maintained while the window W and the display panel P are separated from each other. As an example, it is possible to constantly maintain the temperature of the adhesive film AF (see, e.g., FIG. 16) for attaching the window W and the display panel P.

The housing 400 may prevent foreign materials from becoming attached to the window W or the display panel P while the window W and the display panel P are separated from each other.

The cooling part 200 capable of cooling the display device DE may be positioned below the housing 400. The cooling part 200 may cool the supporting part 100 by contacting the supporting part 100, and a structure capable of transferring heat such as a heat pipe, or the like may be disposed in the cooling part 200. The cooling part may cool the display device DE to from about −70° C. to −100° C., as described above in more detail.

An upper side surface of the cooling part may be in direct contact with the supporting part 100. Thus, the cooling part 200 may cool the supporting part 100 by heat conduction.

The cooling part 200 may be coupled to a lower portion of the supporting part 100 to be in contact with the supporting part 100. As an example, the body 110 having the receiving groove 130 formed therein may be in contact with the cooling part 200. The body 110 may include a material having high heat conductivity, and thus the body 110 may be cooled relatively rapidly. For example, the supporting part 100 may be cooled by the cooling part 200. As an example, the body 110 may include at least one metal of copper (Cu) and aluminum (Al).

According to an exemplary embodiment of the present invention, the cooling part 100 may cool the supporting part 100 while being in direct contact with the supporting part 100, thus shortening a time for cooling the display device DE positioned on the supporting part 100. As an example, since a process of cooling the display device DE from the outside and then moving the display device DE onto the supporting part 100 is omitted, a working time may be shortened.

In addition, the cooling part 200 may constantly maintain the temperature of the adhesive film AF while the window W and the display panel P are separated from each other. For example, the cooling part 200 may constantly maintain a temperature at which adhesion of the adhesive film AF is decreased.

The fan-filter part 800 may be disposed on the housing 400 and may generate airflow. For example, the fan-filter part 800 may blow air from the upper side of the housing 400 to downwardly move an airflow in the housing 400. Thus, foreign materials, and the like in the housing 400 may be downwardly moved. The foreign materials may be downwardly moved along with the airflow, thus reducing or preventing the foreign materials from being attached to the window W and the display panel P.

The fan-filter part 800 may downwardly discharge $N_2$ or clean dry air (CDA). Thus, the formation of a frost in the housing 400 by the cooling part 200 may be reduced or eliminated.

Figure 24:
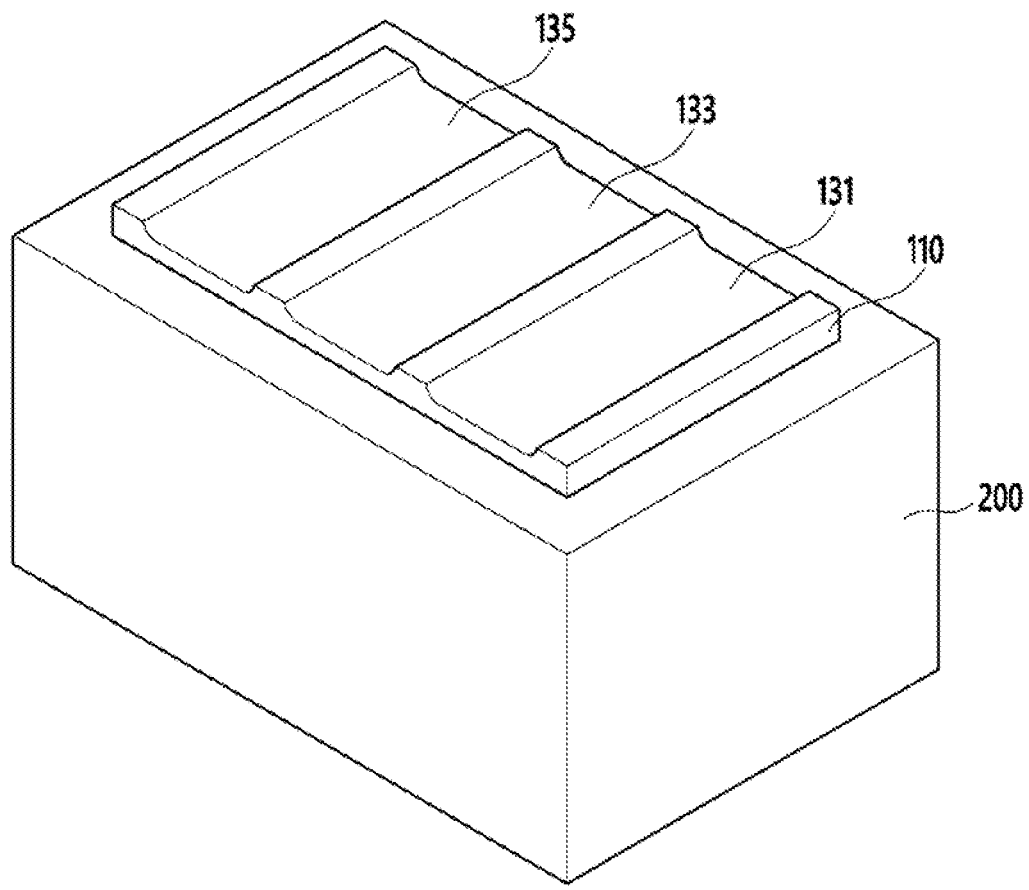
FIG. 24 is a schematic perspective view of a supporting part according to an exemplary embodiment of the present invention.

Referring to FIG. 24, the body 110 may include a plurality of receiving grooves 131, 133, and 135. Thus, a plurality of display devices DE (see, e.g., FIG. 1) may be disposed on the supporting part 100, and thus a plurality of windows W and display panels P of a plurality of display devices DE may be separated from each other substantially simultaneously.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A system for disassembling a display device, the system comprising:
   a supporting part facing a window and supporting at least a portion of the window, wherein the window comprises a first region and a second region;
   a window fixing part comprising a first fixing plate and a second fixing plate disposed on the supporting part and configured to fix a position of the window with respect to the supporting part;
   a display panel stopper positioned above the supporting part and spaced apart from the supporting part by a predetermined distance;
   a window pressurizing part comprising a pressurizing plate including at least one pressurizing protrusion extending from the pressurizing plate, wherein the at least one pressurizing protrusion is configured to apply pressure to the second region of the window along a first direction orthogonal to an upper surface of the supporting part; and
   a separating stick movable along a second direction, wherein the second direction intersects the first direction, and wherein the separating stick is configured to be inserted between the window and a display panel adhered to the window.

2. The system of claim 1, wherein the supporting part includes at least one receiving groove configured to receive the window when pressure is applied to the window by the window pressurizing part.

3. The system of claim 2, wherein the at least one receiving groove is configured such that the second region of the window is downwardly moved along the first direction by the window pressurizing part by from about 3 mm to about 8 mm.

4. The system of claim 1, wherein the window fixing part includes contact bars in direct contact with opposite end portions of the first region of the window facing along a third direction intersecting the first direction and the second direction.

5. The system of claim 4, wherein the opposite end portions of the window are upwardly bent along the first direction.

6. The system of claim 4, wherein the contact bars are movable along the first direction and the third direction.

7. The system of claim 1, wherein the display panel stopper is disposed on the display panel along the first direction.

8. The system of claim 7, wherein the display panel stopper is positioned to be substantially in parallel with the display panel.

9. The system of claim 1, wherein the display panel stopper includes:
a first plate positioned to be substantially in parallel with the display panel; and
at least one impact absorbing part coupled to the first plate, and including a contact plate facing the display panel and an elastic member coupled to the contact plate.

10. The system of claim 9, wherein the contact plate adsorbs and fixes the display panel.

11. The system of claim 1, wherein the at least one pressurizing protrusion is in direct contact with the second region and is configured to provide downward pressure to the second region of the window along the first direction.

12. The system of claim 11, wherein a first pressurizing protrusion and a second pressurizing protrusion extend from the pressurizing plate, and wherein the first and second pressurizing protrusions are arranged along a third direction intersecting the first direction and the second direction.

13. The system of claim 11, wherein the at least one pressurizing protrusion includes a bar-shaped member extended along the first direction; and
a pressurizing tip coupled to the bar-shaped member and including a flexible material.

14. The system of claim 13, wherein:
the at least one pressurizing protrusion is configured to apply a force of from about 8 kgf to 12 kgf to the second region of the window.

15. The system of claim 1, wherein the separating stick includes a first inclined surface at one end portion thereof.

16. The system of claim 15, wherein the first inclined surface of the separating stick is directed toward the display panel.

17. The system of claim 1, further comprising:
a cooling part comprising a heat conductor in direct contact with the supporting part, wherein the heat conductor is configured to cool the supporting part.

18. The system of claim 17, wherein:
the cooling part cools the supporting part to from about −70° C. to about −100° C.

19. The system of claim 17, wherein:
the supporting part includes at least one metal including cooper (Cu) or aluminum (Al).

20. A method for disassembling a display device, the method comprising:
providing a display device including a window, wherein the window includes a first region and a second region positioned around the first region, and wherein a display panel is disposed on the first region of the window;
cooling the display device;
fixing, by a window fixing part, a position of the window to a supporting part supporting at least a portion of the window;
applying pressure, by a window pressurizing part, to the second region of the window along a first direction orthogonal to an upper surface of the window and intersecting the second region of the window; and
inserting a separating stick between the window and the display panel along a second direction intersecting the first direction at the second region of the window.

21. The method of claim 20, wherein the cooling of the display device is performed before the display device is disposed on the supporting part.

22. The method of claim 20, wherein the cooling of the display device is performed after the display device is disposed on the supporting part.

23. The method of claim 20, wherein the window fixing part includes contact bars in direct contact with opposite end portions of the first region of the window facing along a third direction intersecting the first direction and the second direction.

24. The method of claim 23, wherein the opposite end portions of the window are upwardly bent along the first direction.

25. The method of claim 20, wherein the window pressurizing part includes at least one first pressurizing member in direct contact with the second region and configured to downwardly press the second region along the first direction.

* * * * *